Patented Jan. 5, 1943

2,307,198

UNITED STATES PATENT OFFICE 2,307,198

ADHESIVE

Edwin W. Colt, Evanston, and Earl D. Cornwell, Downers Grove, Ill., assignors to Armour and Company, Chicago, Ill., a corporation of Illinois No Drawing. Application May 25, 1939, Serial No. 275,728

2 Claims. (Cl. 106—136)

This invention relates to adhesives and it comprises an adhesive composition containing blood albumin, glue, hexamethylenetetramine and a liquid aliphatic hygroscopic polyhydroxy compound, such as glycerine, ethylene glycol, and the like, in quantities sufficient to yield a composition having thermoplastic properties.

Plywood veneers, and like relatively thin panels of construction materials containing laminated sheets of wood, cloth, etc., are customarily made by applying adhesive material to the adjacent surfaces thereof and assembling the sheets so as to give a strong, unitary laminated product. Plywood is a typical example of such laminated articles. Wood veneers of this type are made by gluing two or more layers of wood together to form a panel. In many instances the outer surface layer of such a plywood structure may only be one-hundredth of an inch thick. The expensive ornamental woods are frequently glued to a backing of a cheaper wood, and when the outer ornamental surface is of paper-like thickness the gluing problem is difficult to solve. Wet adhesives penetrate through the thin veneer surfaces and show a stain on the external surface.

At the present time two general assembly methods are followed. In one, adhesive in the form of a thin preformed sheet or film is interposed between sheets of wood veneer and the laminated structure put under heat and pressure to melt the adhesive film and cause it to unite the wood sheets. In another typical process a solution of the adhesive material is applied to one or both adjacent surfaces of two sheets of wood, the surfaces brought together in a hot press and bonded together by the adhesive therebetween.

The use of preformed adhesive films is expensive and is not convenient on a commercial scale. The application of adhesive solutions followed by assembly and pressing also has many unsatisfactory aspects. Warping and blistering frequently occurs.

We have wanted to prepare an adhesive composition which avoided disadvantages hitherto well recognized as inherent in any bonding agent used for the manufacture of veneered articles. And as a result of our experiments we have discovered an adhesive composition which overcomes all of the objections hitherto encountered in the past.

In the present invention we use a mixture of blood albumin, glue, hexamethylenetetramine and a thermoplasticity-imparting agent as more fully described presently. Blood albumin is an adhesive material which will coagulate when heated to a temperature of over 160° F. and in its coagulated state provides a particularly strong water-proof bond. Glue, of course, is a well-known adhesive material which can be rendered water-proof by the action of formaldehyde, advantageously liberated from hexamethylenetetramine. A simple aqueous mixture of blood albumin, glue and hexamethylenetetramine will not, however, provide a satisfactory adhesive for application in liquid form to surfaces to be veneered. By the present invention we have been able to adopt these advantageous adhesive materials to use as a bonding agent for wood panels and like materials. Our invention is based upon the discovery that the addition of hygroscopic substances, such as glycerine, ethylene glycol, sorbitol, mannitol, and similar polyhydroxy-containing compounds markedly improves the characteristics of the adhesive. But our invention is not based merely upon the addition of such hygroscopic materials regardless of proportions. We have discovered that certain relationships with respect to proportions must be observed if the desired results are to be obtained. We are aware that glycerine has hitherto been used for the purpose of rendering preformed dry adhesive films flexible and somewhat elastic, as in British Patent 346,264. In such cases the amount of glycerine or other hygroscopic material is very low, normally about 8% by weight, and the purpose, as stated, of the glycerine is simply that of keeping the dried film somewhat moist and thus prevent it from completely drying out and becoming brittle. Adhesive films of this type are assembled between two or more sheets of wood veneer and the laminated structure subjected to heat and pressure.

When we incorporate glycerine or like hygroscopic substances in the composition of the present invention we use much more glycerine than has hitherto been employed, and the large quantities necessarily present perform new functions. We have found that the hygroscopic agent, if enough be present, acts to impart temporary thermoplasticity to the adhesive during the setting period under heat and pressure. In consequence, thermoplasticity in the adhesive is maintained for a long enough time prior to coagulation of the blood albumin to permit the adhesive to flow during the hot pressing operation and thus distribute itself uniformly throughout the areas to be bonded and form a firm homogeneous bond uniting the articles. This new function of the glycerine will be more clearly understood as the description of our invention proceeds.

Quantitatively, the amount of glycerine in our composition is from about 23% to 35% of the whole, on a dry basis. The hexamethylenetetramine amounts to about 0.2% to 1% of the mixture. The blood albumin and glue account for the rest, but the blood albumin and glue can be used in widely varying proportions ranging from ratios of 4 parts of blood albumin to 1 part of animal glue down to substantially equal quantities of blood albumin and glue. Thus one typical formula is as follows: 35 parts by weight of glycerine, 1 part by weight of hexamethylenetetramine, 52 parts by weight of blood albumin, and 13 parts by weight of glue. Another is 35 parts by weight of glycerine, 1 part by weight of hexamethylenetetramine, 31 parts by weight of blood albumin and 33 parts by weight of glue. Another is as follows: 23 parts by weight of glycerine, 0.2 to 1 part by weight of hexamethylenetetramine, 38 parts by weight of glycerine, 0.2 to 1 part by weight of hexamethylenetetramine, 38 parts by weight of glue and 30 parts by weight of blood albumin.

In every instance, however, the glycerine should amount to at least 23% and not more than about 35% by weight of the entire mixture on a dry basis. When other hygroscopic materials are used the quantity thereof is not necessarily that given for glycerine. Functionally, the amount of hygroscopic material present is such that temporary plasticity is imparted to the adhesive during the hot pressing of articles to be veneered. With ethylene glycol the minimum and maximum quantities thereof are about the same as with glycerine. The amount to be used depends upon the thermoplasticity-imparting qualities of the polyhydroxy compound.

Thus, for example, we dissolve about 52 parts by weight of blood albumin in enough water to produce a thin flowing solution. The quantity of water is not critical. Only enough need be added to enable the constituents of the adhesive to be admixed readily. About 13 parts by weight of animal glue are likewise allowed to soak in water and the aqueous mixture heated to aid in solution of the glue. Then from 23 to 35 parts by weight of glycerine are added to the glue solution. Finally, about 0.2 to 1 part by weight of hexamethylenetetramine are also dissolved in the glue solution and the glue-glycerine mixture stirred into the blood albumin solution.

This adhesive solution is then applied to one of two surfaces to be joined together or, if desired, to both of the two surfaces. The surfaces are allowed to dry until practically all of the free water is evaporated. Then the two surfaces having the adhesive coating thereon are brought face to face and the assembled panel placed in a hydraulic press, pressure applied, and platens heated to a coagulating temperature, usually 180° F. or above. As customary in the art the temperature does not ordinarily exceed 250° F. Five minutes is usually long enough to insure the setting of the adhesive but this can be varied as requirements may dictate. The pressure can then be released and the panel removed without any intermediate cooling, which is an advantage. Additional panels or plys can be added as desired to the hot panel as it comes from the press.

During the setting of the adhesive under heat and pressure the action is probably as follows. The glycerine or other hydroscopic material causes the composition to be temporarily thermoplastic as the temperature increases up to the coagulation point of the albumin. During the heating operation the hexamethylenetetramine decomposes to liberate formaldehyde and ammonia, and the formaldehyde acts to tan the glue. Finally, the blood albumin coagulates to give a strong water-proof bond. Thus the composition of the present invention is thermoplastic during the time heat is applied to the panels and up to the point where the composition undergoes thermo-setting. The present composition has both thermoplastic and thermo-setting properties.

If the blood albumin be omitted from the composition the adhesive bond obtained is not waterproof in spite of the fact that the hexamethylenetetramine has a tanning action on the glue. Although the glue is rendered somewhat water-resistant it is by no means water-proofed. If the glue be left out the dry strength of the panel is greatly lessened. Moreover, the glue coacts with the glycerine in the composition to retain the glycerine in the adhesive layer during the drying period prior to assembly and hot pressing. It is essential for our invention that glycerine or other hygroscopic agent be in the adhesive film at the time the dried surfaces are brought together. If glue is omitted we find that the glycerine actually leaves the adhesive layer and penetrates the wood during the preliminary drying step. If this happens the glycerine is no longer capable of lending thermoplastic properties to the adhesive layer. Hexamethylenetetramine, of course, is necessary for waterproofing purposes.

Thus, when we put two wood surfaces face to face each of which carries a dried coating of our adhesive there is in this coating blood albumin, glue, hexamethylenetetramine and glycerine. When the articles are assembled under heat and pressure the glycerine maintains thermoplasticity in the adhesive up to the point of setting or coagulation. During the heating period the glycerine slowly tends to migrate from the adhesive film into the wood. If an insufficient amount of glycerine is present, for example, only enough to keep the mixture slightly hygroscopic, there would not be enough present to impart plasticity during the heat-setting operation. The glycerine causes fusion of the adhesive constituents during the heating operation and thus coacts with the adhesive material itself to aid in the formation of a firm bond. The adhesive layer must temporarily develop plastic flow before coagulation of the blood albumin occurs, and the glycerine accomplishes this. Were it omitted, or were it used in insufficient quantity, no adhesive bond would be set up between the surfaces to be joined. The blood albumin would simply coagulate at the heating temperature but there will be no plastic flow.

In consequence, it will be apparent that the amount of glycerine or other hygroscopic material used must be enough to perform the function described. Glycerine in quantities below about 23% will not develop the necessary plastic flow during heating. Glycerine, in quantities of more than 35% unduly prolongs the drying rate of the solution after application to the veneer surface. Although more than 35% of glycerine can be used, it is wasteful.

Thus our invention turns upon the addition of liquid organic hygroscopic agents to blood albumin, glue, hexamethylenetetramine adhesives in quantities sufficient to act as temporary thermoplasticity-imparting agents. It will be obvious that any liquid organic hygroscopic agent will be adaptable and we do not intend that our invention shall be limited to glycerine.

Hexamethylenetetramine is the preferred formaldehyde-yielding agent but others can also be used for the purpose of tanning the glue during the heating stage.

Those skilled in the art will understand that by "blood albumin" we mean to include soluble whole dried blood, or the defibrinated serum from whole blood or any mixtures of the components of blood obtained from whole blood.

Having thus described our invention, what we claim is:

1. A blood albumin-glue-hexamethylenetetramine adhesive containing about 23% to 35% of glycerine on a dry basis.

2. An adhesive composition comprising blood albumin, glue, a formaldehyde-yielding agent, and about 23 per cent to 35 per cent of glycerine on a dry basis.

EDWIN W. COLT.
EARL D. CORNWELL.